(12) United States Patent
Tan et al.

(10) Patent No.: US 11,392,744 B2
(45) Date of Patent: Jul. 19, 2022

(54) SYSTEMS AND METHODS FOR AUTOMATICALLY VERIFYING BGA PACKAGE ORIENTATION

(71) Applicant: DELL PRODUCTS L.P., Round Rock, TX (US)

(72) Inventors: Geroncio O. Tan, Austin, TX (US); Lip Vui Kan, Hillbrooks (SG); Merle Wood, III, Round Rock, TX (US); Wei Cheng Yu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/067,469

(22) Filed: Oct. 9, 2020

(65) Prior Publication Data
US 2022/0114319 A1 Apr. 14, 2022

(51) Int. Cl.
*G06F 30/392* (2020.01)
*G06F 1/28* (2006.01)
*G06Q 10/06* (2012.01)

(52) U.S. Cl.
CPC .............. *G06F 30/392* (2020.01); *G06F 1/28* (2013.01); *G06Q 10/06395* (2013.01)

(58) Field of Classification Search
USPC ........................................................ 716/120
See application file for complete search history.

(56) References Cited

U.S. PATENT DOCUMENTS

| 7,999,520 | B2* | 8/2011 | Luo .................. H02J 1/102 323/267 |
| 9,000,786 | B2 | 4/2015 | Luo et al. |
| 9,857,854 | B2* | 1/2018 | Zhang ..................... G06F 1/26 |
| 2002/0022386 | A1* | 2/2002 | Akasaka ............ H05K 7/1061 439/71 |
| 2002/0076966 | A1* | 6/2002 | Carron .................. H01R 4/024 439/330 |

(Continued)

OTHER PUBLICATIONS

Wikipedia, "Pull-Up Resistor", Printed from Internet Sep. 11, 2020, 2 pgs.

(Continued)

*Primary Examiner* — Mohammed Alam
(74) *Attorney, Agent, or Firm* — Egan, Enders & Huston LLP.

(57) ABSTRACT

Systems and methods that may be implemented to automatically sense and verify proper mated orientation of a removable BGA package relative to a mating pad array (e.g., of a BGA socket) prior to supplying power to the BGA package. A removable BGA package may be provided with first and second symmetric pins so as to present different respective circuit states on opposing sides of a center point of its BGA package pin array, such that proper orientation of the BGA package occurs only when a designated one of the first and second symmetric pins is mated with a designated pad of the mating pad array. A programmable integrated circuit may in turn sense the circuit state presented at the designated pad to verify proper orientation of the mated BGA package based on the sensed circuit state presented at the designated pad, and may take one or more designated actions based on whether or not proper orientation of the mated BGA package is verified.

22 Claims, 5 Drawing Sheets

(56) References Cited

U.S. PATENT DOCUMENTS

| | | | |
|---|---|---|---|
| 2002/0090843 A1* | 7/2002 | Chien | H01L 23/49827 |
| | | | 439/71 |
| 2008/0007608 A1* | 1/2008 | Smith | H05K 3/32 |
| | | | 347/111 |
| 2018/0098447 A1* | 4/2018 | Brown | H01R 12/7076 |
| 2021/0034452 A1* | 2/2021 | Tan | G06F 9/4401 |

OTHER PUBLICATIONS

Wikipedia, "Ball Grid Array", Printed from Internet Sep. 12, 2020, 6 pgs.

* cited by examiner

FIG. 4

SYSTEMS AND METHODS FOR AUTOMATICALLY VERIFYING BGA PACKAGE ORIENTATION

FIELD

This invention relates generally to information handling systems and, more particularly, to verification of BGA package orientation in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Ball grid array (BGA) packages are used to solder and permanently mount integrated circuits, such as microprocessors or solid state drives (SSDs), directly to a printed circuit board (PCB). A symmetrical array pattern of electrically-conductive pads connected to the circuitry of the packaged integrated circuit are provided on the underside of the BGA package, and a solder ball is initially adhered to each conductive pad of the BGA package. Using a surface mount technology (SMT) process, the BGA package is then aligned with and placed on a PCB that has corresponding electrically-conductive pads connected to PCB circuitry and arranged in a symmetrical array pattern that matches the pattern of the BGA package pad array, and with the individual solder balls of the BGA package aligned with and contacting corresponding electrically-conductive pads of the PCB. During the SMT solder process, the manufacturer aligns a Pin 1 indicator of the BGA package with a Pin 1 marking on the PCB to ensure proper orientation of the BGA package pad array prior to energizing power to BGA package, and thus prevent damage to the integrated circuit of the BGA package and a voltage regulator (VR) supplying power to the BGA package. The assembled BGA package and PCB are then heated to melt or reflow the solder balls between the pads of the BGA package and corresponding pads of the PCB. The solder assembly is then cooled to solidify the solder between the BGA package pads and the PCB pads, which forms permanent soldered connections between the circuitry of the integrated circuit and the PCB circuitry with the BGA package permanently attached by solder to the PCB board.

SUMMARY

Disclosed herein are systems and methods that may be implemented to automatically sense and verify proper mated orientation of a pin array of the BGA package relative to a mating pad array to which the BGA package is mated prior to supplying power to the BGA package. In one embodiment, the BGA package may be a removable module that is received without soldering into a mating BGA socket that is mounted to a PCB and that contains a mating array of electrically-conductive pads that are connected to circuitry of the PCB. In such an embodiment, the disclosed systems and methods may be employed to automatically verify proper orientation of the array of electrically-conductive pins of the BGA package relative to the mating array of electrically conductive pads of the BGA socket to which the electrically-conductive pins of the BGA package are mechanically mated without solder. In an alternate embodiment, the disclosed systems and methods may be employed to automatically verify proper orientation of conductive pins of a BGA package array that are mated (e.g., with non-soldered or soldered connections) to an array of electrically-conductive pads directly mounted on a PCB. The disclosed systems and methods may be implemented to automatically verify proper orientation of a variety of types of BGA packages including, but not limited to, a solid state drive (SSD) BGA package, a central processing unit (CPU) BGA package, an embedded controller (EC) BGA package, etc.

In one embodiment, a removable BGA module (e.g., SSD BGA package) may be enabled to indicate if it is properly seated or otherwise received within a mating BGA socket. For example, a BGA package may be provided with first and second symmetric pins that are coupled to BGA package circuitry so as to present different respective circuit states (e.g., floating no contact (NC) and circuit ground or other different circuit states) on opposing sides of the center point of the BGA package pin array. In this embodiment, a single designated pad of fixed location in the mating pad array of a BGA socket may be provided in a position configured to mate with either one of the first and second symmetric pins of the BGA package, depending on the orientation of the mated BGA package relative to the mating pad array. Proper orientation of the BGA package is achieved only when a designated one of the first and second symmetric pins is mated with the designated pad of the mating pad array. In this way, at least one programmable integrated circuit may be electrically coupled to sense the circuit state (e.g., floating no contact or circuit ground) presented at the designated pad when the BGA package is mated with the mating pad array of the BGA socket. The programmable integrated circuit may therefore verify proper orientation of the mated BGA package relative to the mating pad array of the BGA socket based on the sensed circuit state presented at the designated pad of the mating pad array, and may take one or more designated actions based on whether or not proper orientation of the mated BGA package is verified, e.g., such as disabling power to the BGA package and/or displaying an error message to a user of an information handling system that includes the VR and BGA package.

In one embodiment, a voltage regulator (VR) may be coupled to provide power at a first node of the VR through a mating pad array to an integrated circuit of a mated BGA package that is configured as described above, and an integrated circuit of the VR (e.g., VR controller) may also be coupled at a second node of the VR to a designated pad of the mating pad array to verify the proper orientation of the mated BGA package relative to the mating pad array prior to energizing power through the first VR node to the integrated circuit of the BGA package. In such an embodiment, the programmable integrated circuit of the VR may be coupled to directly or indirectly sense a voltage present at the second VR node, and to use this sensed voltage as an indication of the circuit state (e.g., floating no contact versus circuit ground) presented at a designated pad of the mating pad array by the mated BGA package. Thus, the VR may be provided with the ability to check for and confirm proper orientation of a BGA package device relative to a BGA socket prior to enabling a VR power output to supply power to the BGA package so as to avoid damaging the BGA package device and the VR itself.

In one exemplary embodiment, a sensing circuit may be provided that includes a comparator to compare a reference voltage (e.g., $V_{REF}$) to the voltage present at a second VR integrated circuit (IC) node, together with a switch and one or more resistors that are coupled between the second VR IC node and circuit ground. In this embodiment, a control signal that is coupled to the designate pad of the mated pad array of the BGA socket may be used to control the state of the switch (e.g., ON or OFF) based on the particular circuit state presented at the designated pad of the mating pad array by the mated BGA package, e.g., a floating no contact state results in a high control signal that turns the switch ON and a circuit ground state results in a low control signal that turns the switch OFF. In operation of such an example embodiment, the reference voltage ($V_{REF}$) may be applied to both the designated pad of the mated pad array and to the second VR IC node. The control signal will be low or high based on the circuit state (e.g., floating no contact or circuit ground) presented at the designated pad of the mated pad array of the BGA socket. The resulting voltage of the second VR IC node may be compared to $V_{REF}$ to determine whether the BGA package is properly oriented to relative to the mating pad array.

In the example configuration of the above embodiment, a floating no contact state presented at the designated pad of the mating pad array of the BGA socket turns ON the sensing circuit switch which allows current to flow through the sensing circuit resistor/s to circuit ground from the second VR IC node, which drops the sensed voltage at the second VR IC node below $V_{REF}$, thus verifying proper orientation of the mated BGA package relative to the mating pad array. In such a proper orientation case, an output from the VR comparator circuit enables the voltage regulator (VR) to provide power at the first IC node of the VR to the mated BGA package. However, a circuit ground state presented at the designated pad of the mating pad array of the BGA socket turns OFF the sensing circuit switch which prevents current from flowing through the sensing circuit resistor/s to circuit ground from the second VR IC node, and thus voltage sensed by the comparator circuit remains equal to $V_{REF}$ at the second VR IC node, which indicates improper orientation of the BGA package relative to the mating pad array. In such an improper orientation case, an output from the VR comparator circuit disables the voltage regulator (VR) from providing power at the first IC node of the VR to the mated BGA package.

In a further embodiment, an additional programmable integrated circuit (e.g., such as an embedded controller or CPU of an information handling system) may optionally sense the circuit state (e.g., floating no contact or circuit ground) presented at the designated pad of the BGA socket when the BGA package is mated with the mating pad array of the BGA socket, e.g., by sensing the high/low state of the same control signal that is coupled between the above-described switch of the sensing circuit and the designated pad of the mated pad array. This additional programmable integrated circuit may respond to a sensed circuit state (e.g., a low control signal) that indicates improper orientation of the BGA package relative to the mating pad array by taking an additional action, e.g., such as displaying an error message to a user of an information handling system that includes the VR, BGA socket array and the mated BGA package. On the other hand, the additional programmable integrated circuit may respond to a sensed circuit state (e.g., a high control signal) that indicates proper orientation of the BGA package relative to the mating pad array of the BGA socket by taking no such additional action and allowing normal VR power and BGA package operation to proceed.

In one embodiment, circuitry including a programmable integrated circuit of a VR may be coupled via circuitry on a PCB to automatically verify the proper mated orientation of a pin array of a socket-based BGA SSD package (i.e., that includes a BGA SSD integrated circuit mounted to a transposal board) relative to a mating pad array of a BGA socket that is mounted together with the VR on the PCB, e.g., such as a main board or motherboard of an information handling system. In such an embodiment, the transposal board of the BGA SSD package is dimensioned and configured to plug into the BGA socket, and the BGA ball map of the BGA SSD package pin array may be symmetrical, i.e. such that BGA SSD package may be physically inserted into the mating BGA socket in either of two positions that are rotated 180° from each other. However, only a first one of the positions is proper and acceptable, while the other rotated position is improper and the resulting mismatch of the pins of the BGA package pad array with the pads of the mating socket pad array may potentially result in damage to the BGA SSD as well as the VR that is supplying coupled to supply power to the BGA SSD. Therefore the disclosed systems and methods may be advantageously implemented to automatically detect and ensure proper orientation of a socket-based BGA SSD package prior to energizing power from the VR to the BGA SSD, e.g., when an information handling system end user places or replaces a BGA SSD package within a BGA socket of an information handling system.

In one respect, disclosed herein is an information handling system, including: a removable BGA package having first and second electrically-conductive pins disposed on a first side of the removable BGA package in symmetric relationship to each other on opposing sides of a center point of the first side of the removable BGA package so as to present different respective circuit states on opposing sides of the center point; a BGA socket configured to mate with the removable BGA package, the BGA socket having a first electrically-conductive pad disposed on a first side of the BGA socket; and at least one programmable integrated circuit electrically coupled to the first electrically-conductive pad of the BGA socket. The at least one programmable integrated circuit may be programmed to sense a mated orientation of the removable BGA package relative to the BGA socket based on the circuit state presented to the first electrically-conductive pad of the BGA socket by the first or second electrically-conductive pin of the removable BGA package. The at least one programmable integrated circuit may be programmed to take at least one action based on the sensed mated orientation of the removable BGA package relative to the BGA socket.

In another respect, disclosed herein is a system, including a voltage regulator electrically coupled to provide power to a power-consuming component of a removable BGA package through a BGA socket, the voltage regulator including at least one programmable integrated circuit. The at least one programmable integrated circuit may be programmed to: sense a mated orientation of the removable BGA package relative to a BGA socket based on a circuit state presented to a first electrically-conductive pad of the BGA socket by an electrically-conductive pin of the removable BGA package; and enable output of power from the voltage regulator to a power-consuming component of the removable BGA package only if the sensed mated orientation of the removable BGA package relative to the BGA socket is a correct orientation.

In another respect, disclosed herein is a method, including executing logic on a programmable integrated circuit to: sense a mated orientation of a removable BGA package relative to a BGA socket based on a circuit state presented to a first electrically-conductive pad of the BGA socket by a first or second electrically-conductive pin of the removable BGA package, the first and second electrically-conductive pins being disposed on a first side of the removable BGA package in symmetric relationship to each other on opposing sides of a center point of the first side of the removable BGA package so as to present different respective circuit states on opposing sides of the center point to the first electrically-conductive pad of the BGA socket; and take at least one action based on the sensed mated orientation of the removable BGA package relative to the BGA socket.

DESCRIPTION OF ILLUSTRATIVE EMBODIMENTS

Figure 1:
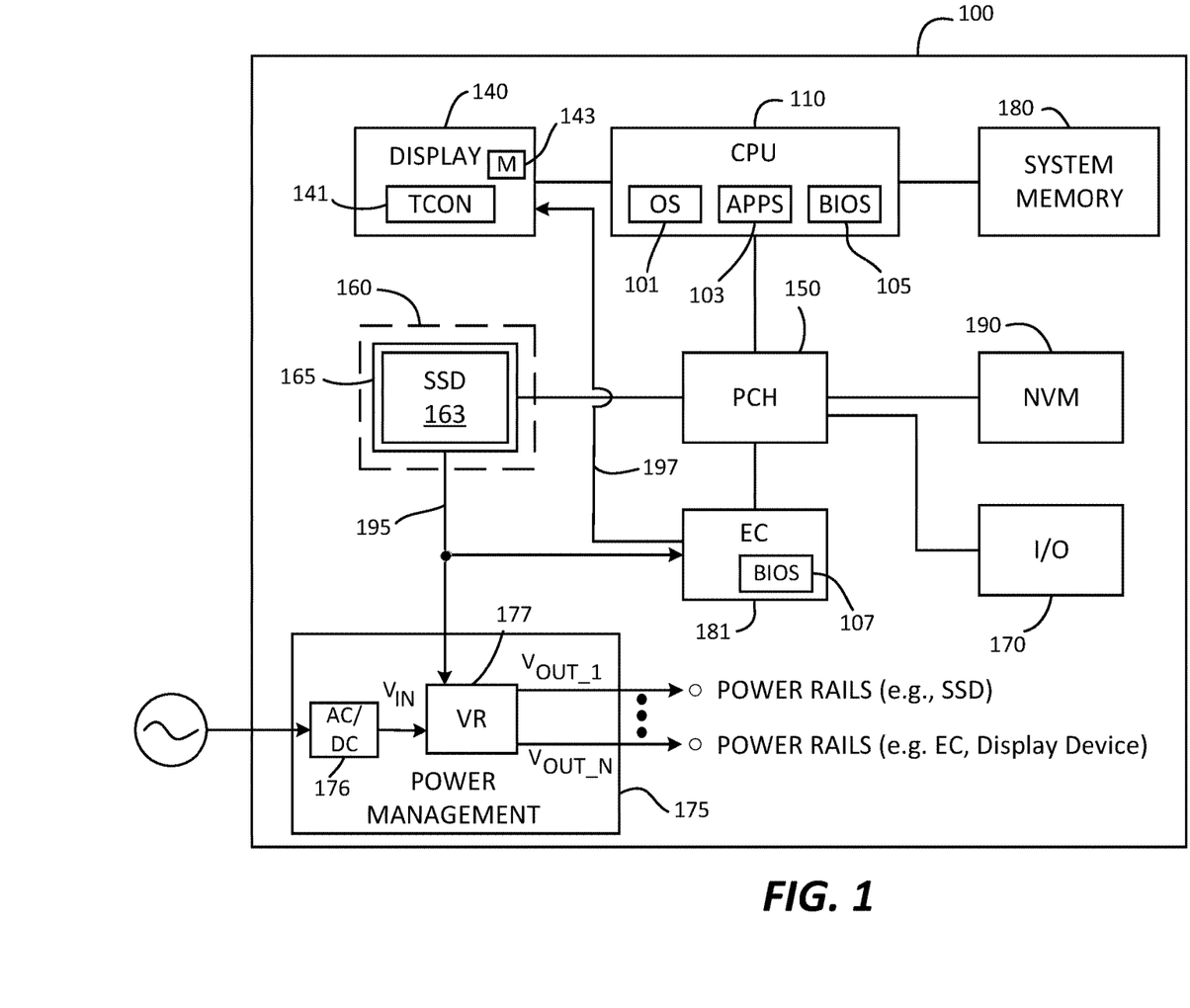
FIG. 1 illustrates a block diagram of an information handling system according to one exemplary embodiment of the disclosed systems and methods.

FIG. 1 is a block diagram of an information handling system 100 (e.g., a desktop computer, tower computer, laptop computer, tablet computer, etc.) as it may be configured according to one embodiment of the disclosed systems and methods. In this regard, it should be understood that the configuration of FIG. 1 is exemplary only, and that the disclosed methods may be implemented on other types of information handling systems. In one embodiment, all of the components of information handling system 100 may be contained within a system chassis enclosure (e.g., sheet metal and/or plastic case) as shown by the solid line enclosing these components in FIG. 1. It should be further understood that while certain components of an information handling system are shown in FIG. 1 for illustrating embodiments of the disclosed systems and methods, the information handling system is not restricted to including only those components shown in FIG. 1 and described below.

As shown in FIG. 1, information handling system 100 may generally include a host programmable integrated circuit 110, such as an Intel central processing unit (CPU), an Advanced Micro Devices (AMD) CPU or another programmable integrated circuit. As shown, host programmable integrated circuit 110 is executing an operating system (OS) 101 (e.g., proprietary OS such as Microsoft Windows 10, open source OS such as Linux OS, etc.), and other code including one or more user applications 103 and basic input/output system (BIOS) 105. Host programmable integrated circuit 110 may also be coupled to volatile system memory 180, which may include, for example, random access memory (RAM), dynamic RAM (DRAM), synchronous DRAM (SDRAM). In the embodiment of FIG. 1, host programmable integrated circuit 110 is configured to access local system non-volatile storage 160 that is provided as a solid state drive (SSD) BGA package 163 that is received in a mating BGA socket 165. Host programmable integrated circuit 110 may also be configured to access non-volatile memory 190 (e.g., serial peripheral interface (SPI) Flash memory) to load and boot part of a system basic input/output system (BIOS) as shown.

In the embodiment of FIG. 1, host programmable integrated circuit 110 may also be coupled to an external or internal (integrated) display device 140 (e.g., including LCD or LED display panel or other suitable display technology) depending on the particular configuration of information handling system 100. In such an embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processing unit "GPU") may be coupled between host programmable integrated circuit 110 and display device 140 to provide graphics capability for information handling system 100.

In one embodiment, display device 140 may be integrated within a system chassis of information handling system 100, although display device 140 may be a separate discrete component outside the system chassis enclosure that is coupled by a data bus to components of the information handling system 100 within the system chassis enclosure. As shown, display device 140 itself includes non-volatile memory 143 and an integrated timing controller (TCON) 141 (e.g., such as microcontroller) that is programmed to retrieve stored image data from display memory 143 and to receive image data from integrated graphics processing of host programmable integrated circuit 110 and/or a separate discrete graphics processing unit (when present), convert the format for input to source drivers of display device 140 and generate controlling signals for gate and source drivers of display device 140. Display device 140 is also coupled as shown to receive instructions or commands 197 from an embedded controller (EC) 181 of system 100 as described further herein.

In the embodiment of FIG. 1, platform controller hub (PCH) 150 may be present as shown to control certain data paths and to manage information flow between components of the information handling system 100. As such, PCH 150 may include one or more integrated controllers or interfaces for controlling the data paths connecting PCH 150 with host programmable integrated circuit 110, local system storage 160, internal (integrated) or external input/output (I/O) devices 170 (e.g., keyboard, mouse, trackpad, etc.) forming at least a part of a user interface for the information handling system, embedded controller (EC) 181, and NVM 190, e.g., where BIOS firmware image and settings may be stored together with other components including ACPI firmware, etc. In one embodiment, PCH 150 may include a Serial Peripheral Interface (SPI) controller and an Enhanced Serial Peripheral Interface (eSPI) controller. In the embodiment of FIG. 1, I/O devices 170 may be coupled to PCH 150 of system 100 to enable a system end user to input data and interact with information handling system 100, and to interact with application programs or other software/firmware executing thereon. A BGA SSD of BGA SSD package 163 may be coupled as local system storage through PCH 150 to provide non-volatile storage for information handling system 100.

In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (I²C) interface, a Universal Serial Bus (USB) interface and a Thunderbolt™ interface. It will be understood that in other embodiments, components of information handling system 100 may be coupled together and to host programmable integrated circuit 110 without the presence of PCH 150 (e.g., using any suitable combination of interfaces, data buses, etc.)

Power for the information handling system 100 may be provided via an external AC power source (e.g., mains power) and/or by an internal DC power source, such as a battery (not shown). As shown in FIG. 1, power management circuitry 175 may be included within information handling system 100 for moderating the available power from the power source, as well as to perform other power-related administrative tasks of the information handling system. In the illustrated embodiment, power management circuitry 175 includes an AC to DC converter circuit that provides input voltage ($V_{IN}$) to a DC to DC voltage regulator (VR) 177 that controls and moderates the available power from the power source to other power-consuming components of system 100. In this regard, VR 177 may be coupled as shown to separately provide operating voltages ($V_{OUT\_1}$ to $V_{OUT\_N}$) on multiple different respective power rails to different power-consuming components of the information handling system 100 (including BGA SSD of BGA SSD package 163, host programmable integrated circuit 110, embedded controller (EC) 181, display device 140, etc.). It will be understood that in one embodiment EC 181 and display device 140 may be powered by a power rail and $V_{OUT\_N}$ from VR 177 that is separate and different from the power rail and $V_{OUT\_1}$ from VR 177 that are coupled to power BGA SSD of BGA SSD package 163. In this way, EC 181 and display device 140 may be selectively powered by $V_{OUT\_N}$ of VR 177 at the same time that no power is provided by $V_{OUT\_1}$ of VR 177 to power BGA SSD of BGA SSD package 163.

In one embodiment, VR 177 may include a microcontroller (e.g., VR controller) for controlling the operation of VR 177 (including separately and independently enabling each of $V_{OUT\_1}$ to $V_{OUT\_N}$) based on a variety of factors, including based on a sensed circuit state of a control signal (FLIP) received across an electrically conductive path 195 (e.g., signal trace of copper, copper alloy, etc.) from BGA SSD of BGA SSD package 163. Further information regarding voltage regulators and operation thereof may be found, for example, in U.S. Pat. Nos. 7,999,520; 9,000,786 and 9,857,854, each of which is incorporated herein by reference in its entirety for all purposes.

As further shown in FIG. 1, EC 181 is coupled to PCH 150 and may be configured to perform functions such as power/thermal system management, monitoring orientation of BGA SSD package 163 within mating BGA socket 165, etc. EC 181 may also be configured to execute program instructions to boot information handling system 100, load application firmware from NVM 190 into internal memory, launch the application firmware, etc. In one example, EC 181 may include a processing device for executing program instructions to perform the above stated functions. As will be described further herein, EC 181 may be coupled to sense the circuit state of control signal (FLIP) provided across an electrically conductive path 195 (i.e., electrical conductor) by BGA SSD of BGA SSD package 163 at system power on, and may be coupled to provide an instruction or command 197 directly to display device 140 to retrieve and display an error message (e.g., incorrect orientation error message) to a system user based on the sensed circuit state of control signal (FLIP). Although not strictly limited to such, processing device of EC 181 may be implemented as a programmable integrated circuit (e.g., a controller, microcontroller, microprocessor, ASIC, etc., or as a programmable logic device "PLD" such as FPGA, complex programmable logic device "CPLD", etc.).

It will be understood that in other embodiments, a different programmable integrated circuit's (e.g., host programmable integrated circuit 110 or another programmable integrated circuit) may alternatively be coupled to sense the circuit state of control signal (FLIP) provided across an electrically conductive path 195 by BGA SSD of BGA SSD package 163 and may be coupled to provide instructions or commands 197 directly to display device 140 based on the sensed circuit state of control signal (FLIP) to retrieve a designated error message (e.g., incorrect orientation error message) from display memory 143 and to display the retrieved designated error message to a system user based on the sensed circuit state of control signal (FLIP) in the manner described herein for EC 181.

Figure 2A:
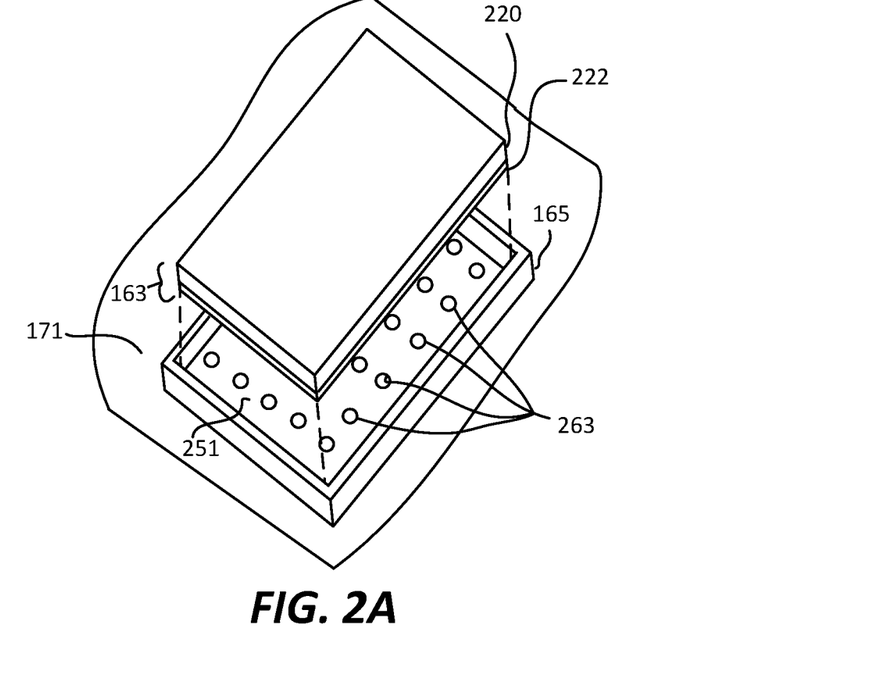
FIG. 2A illustrates an overhead perspective view of a BGA package and mating BGA socket according to one exemplary embodiment of the disclosed systems and methods.

FIG. 2A shows an overhead perspective view of a BGA SSD package 163 that is positioned for insertion into a mating BGA socket 165 mounted on a PCB 171 (e.g., silicon, polyimide, or FR4 board). In this embodiment, BGA SSD package 163 includes a BGA SSD integrated circuit 220 (i.e., that itself includes the SSD circuitry and storage media) mounted onto a transposal board 222 as shown, with conductive pins on the mating underside 250 of transposal board 222 forming a pin array of the BGA SSD package 163. An adhesive or encapsulant (e.g., dielectric adhesive, etc.) may be present between transposal board 222 and BGA SSD integrated circuit 220.

Figure 2B:
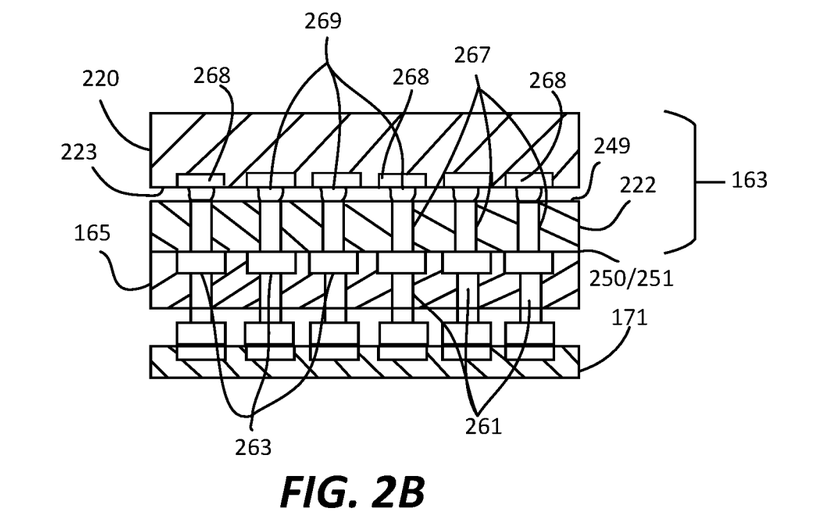
FIG. 2B illustrates a partial side cross-sectional view of a BGA package received in removable mating engagement with a BGA socket according to one exemplary embodiment of the disclosed systems and methods.

FIG. 2B illustrates a partial side cross-sectional view of BGA SSD package 163 received in removable mating engagement with BGA socket 165. FIG. 2B shows an array of electrically-conductive pads 268 provided on the lower side of BGA SSD integrated circuit 220 that are each electrically connected to integrated circuitry within BGA SSD integrated circuit 220. FIG. 2B also shows individual connector balls 269 on the lower surface 223 of BGA SSD integrated circuit 220 that are permanently mated (e.g., soldered by heating and reflow) between individual respective corresponding conductive pads of BGA SSD integrated circuit 220 and conductive pins 267 at the upper surface 249 of transposal board 222 of socket 165. Each conductive pin 267 in turn extends through transposal board 222 and terminates and extends from the lower surface 250 of transposal board 222, which also serves as the lower mating surface of BGA SSD package 163. Each conductive pin 267 at the lower surface 250 of transposal board 222 is removably mated as shown to a corresponding individual conductive pad 263 provided on the upper mating surface 251 of BGA socket 165, i.e., so as to establish an individual electrical connection through transposal board 222 between each individual conductive pad 268 and respective connector ball 269 on the lower surface 223 of BGA SSD integrated circuit 220 and a corresponding individual conductive pad 263 on the upper mating surface 251 of BGA socket 165. Each conductive pad 263 of BGA socket 165 is electrically coupled to corresponding PCB circuitry by a conductive via 261.

Figure 2C:
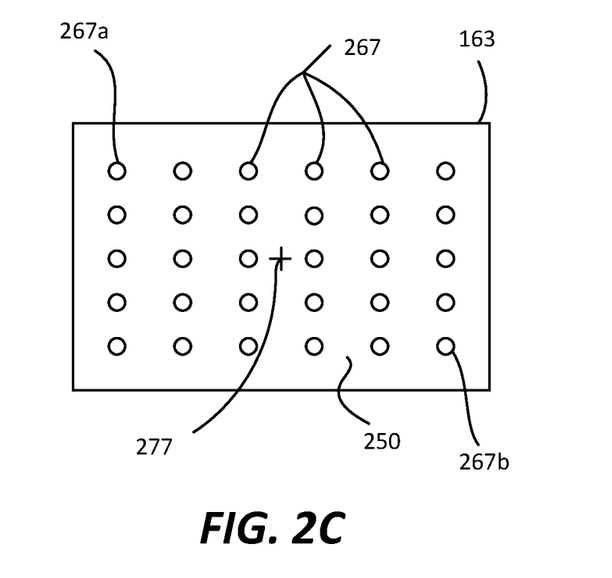
FIG. 2C illustrates an underside view of the lower surface of a BGA package according to one exemplary embodiment of the disclosed systems and methods.

FIG. 2C illustrates an underside view of the lower surface 250 of BGA SSD package 163, showing the symmetrical array of conductive pins 267 present on the mating underside 250 of transposal board 222 of BGA SSD package 163 (i.e., at the lower surface 250 of transposal board 222). Each of conductive pins 267 is aligned, mated with, and soldered to a separate one of conductive pads 268 SSD integrated circuit 220 by a respective connector ball 269 of BGA SSD integrated circuit 220. As shown in FIG. 2C, first and second symmetric conductive pins 267a and 267b are provided in symmetric positions on opposing sides of the center point 277 (i.e., point of symmetry) of the BGA package pin array. In one exemplary embodiment, conductive pin 267a is electrically coupled through a first respective conductive pad 268 to a floating (no contact) circuit within BGA SSD integrated circuit 220, and conductive pin 267b is electrically coupled through another and second respective conductive pad 268 to circuit ground within BGA SSD integrated circuit 220.

Figure 2D:
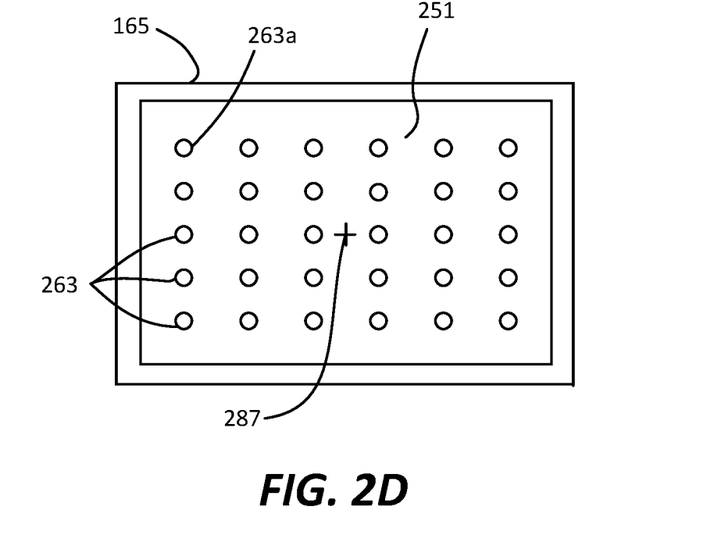
FIG. 2D illustrates a topside view of the upper mating surface a BGA socket according to one exemplary embodiment of the disclosed systems and methods.

FIG. 2D illustrates a topside view of the upper mating surface 251 of BGA socket 165, showing the symmetrical array of mating conductive pads 263 present on the upper mating surface 251 of BGA socket 165 around the center point 287 (i.e., point of symmetry) of the BGA socket pad array. Center point 277 of BGA SSD package 163 is aligned with center point 287 of BGA socket 165 when BGA package 163 is received in mating engagement within BGA socket 165. As shown in FIG. 2D, a designated pad 263a of the mating BGA socket pad array is provided in a position that will mate with and electrically contact either one of conductive pin 267a or conducive pin 267b of the pin array of BGA SSD package 263, depending on the orientation of BGA SSD package 263 when it is received in mating relationship within BGA socket 165. In this embodiment, upper mating surface 251 of BGA socket 165 is configured to receive and face the lower surface 250 of BGA SSD package 163 in one of two opposing orientations that are 180 degrees apart, i.e., with first conductive pin 267a mating with and electrically contacting designated pad 263a in the first one of these orientations and with second conductive pin 267b mating with and electrically contacting designated pad 263a in the second opposing one of these positions.

Figure 3A:
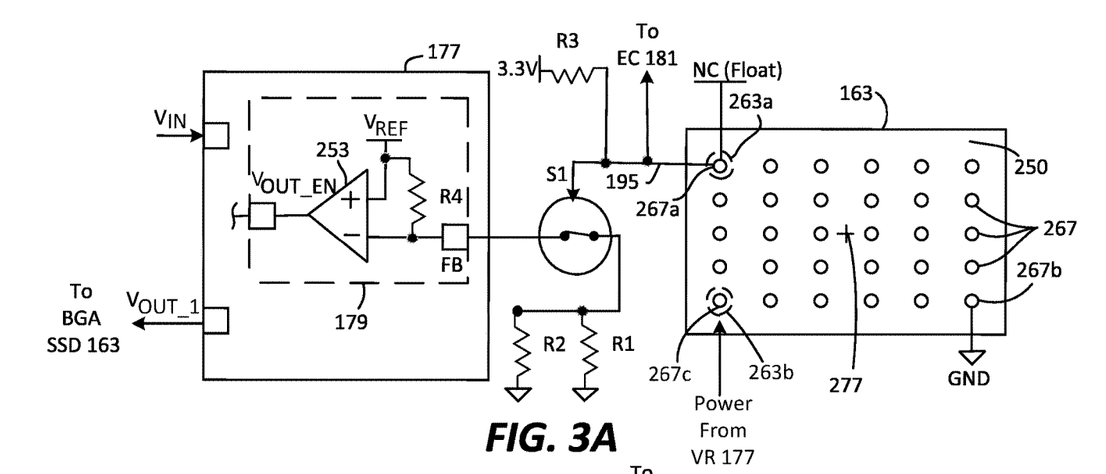
FIG. 3A illustrates a partial schematic and block diagram of a BGA package received in proper or correctly-oriented mating relationship within a BGA socket according to one exemplary embodiment of the disclosed systems and methods.
Figure 3B:
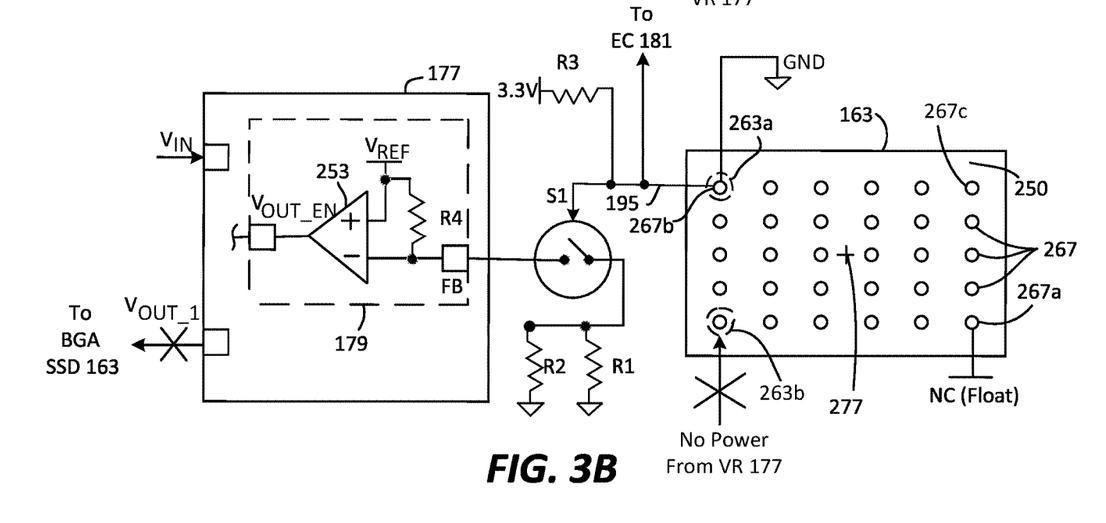
FIG. 3B illustrates a partial schematic and block diagram of a BGA package received in improper or incorrectly-oriented mating relationship within a BGA socket according to one exemplary embodiment of the disclosed systems and methods.

FIGS. 3A and 3B each illustrate a partial schematic and block diagram of one exemplary embodiment of a BGA SSD package 163 received in mating relationship within a BGA socket 165. Also shown in each of FIGS. 3A and 3B is voltage regulator (VR) 177 that includes a VR controller 179 (e.g., in the form of a microcontroller integrated circuit or other programmable integrated circuit) that controls the operation of VR 177. As previously described VR 177 receives DC input voltage ($V_{IN}$) and provides DC output voltage ($V_{OUT\_1}$ to $V_{OUT\_N}$) under the control of VR controller 179. $V_{OUT\_1}$ from VR 177 is provided via power rails to power-consuming system components including BGA SSD 163 of FIG. 1 (e.g., to conductive power input pin 267c of BGA SSD package 163 that is mated to and electrically contacting conductive power output pad 263b of BGA socket 165 in FIG. 3A). In the embodiment of FIGS. 3A and 3B, VR controller 179 implements a comparator 253 to compare a reference voltage (e.g., $V_{REF}$) to the voltage present at a node (FB) of VR controller 179 and provides a voltage output enable signal ($V_{OUT\_EN}$) to enable and disable the $V_{OUT\_1}$ of VR 177 based on this comparison in a manner as further described herein. As shown, $V_{REF}$ is coupled to VR controller node FB through a pull up resistor R4.

In the embodiment of FIGS. 3A and 3B, a switch S1 (e.g., N field effect transistor or N-FET) is coupled as shown between the node FB of VR controller 179 and circuit ground by parallel resistors R1 and R2 (e.g., implemented as a voltage divider R1//R2 in one embodiment), and the circuit state of a designated conductive pad 163a of BGA socket 165 is coupled by a control signal (FLIP) of conductor 195 to control operation of switch S1. Together, comparator 253 of VR controller 179, switch S1, resistors R1 and R2, and control signal (FLIP) conductor 195 form a circuit that operates to sense orientation of BGA SSD package 163 relative to BGA socket 165 as described further herein.

In the illustrated embodiment, a voltage (e.g., 3.3 volts from $V_{OUT\_N}$ of VR 177) is applied through resistor R3 to the control signal (FLIP) conductor 195 and therefore to the designated conductive pad 163a of BGA socket 165 as shown. Control signal (FLIP) signal on conductor 195 controls the state of the switch S1 to be either ON or OFF based on the particular circuit state presented at the designated conductive pad 163a of BGA socket 165 by conductive pin 267a of BGA SSD package 163, e.g., a floating no contact state presented by conductive pin 267a at designated conductive pad 163a results in a high state of control signal on conductor 195 that turns the switch S1 ON, and a circuit ground state presented by conductive pin 267a at the designated conductive pad 163a results in a low control signal on conductor 195 that turns the switch S1 OFF. At the same time, comparator 253 monitors the difference in voltage across the pull up resistor R4. This monitored voltage difference at comparator 253 is representative of the high or low state of control signal on conductor 195 and the resulting state of switch S1, i.e., $V_{REF}$ is greater than $V_{FB}$ when control signal on conductor 195 is high and switch S1 is closed, and $V_{REF}$ is equal to $V_{FB}$ when control signal on conductor 195 is low and switch S1 is open. In this embodiment, comparator 253 selectively outputs a voltage enable signal ($V_{OUT\_EN}$) based on this difference so as to enable $V_{OUT\_1}$ of VR 177 only when $V_{REF}$ is greater than $V_{FB}$, i.e., when control signal on conductor 195 is high and switch S1 is closed. It will be understood that signal trace 195, switch S1 and/or resistors R1, R2 and R3 may be configured in any suitable manner relative to BGA SSD package 163, BGA socket 165, and/or PCB 171, e.g., with each of signal trace 195, switch S1 and/or resistors R1, R2 and R3 being fabricated or otherwise disposed in one embodiment on or within PCB 171, BGA SSD package 163 and/or BGA socket 165.

FIG. 3A shows one exemplary embodiment of a BGA SSD package 163 mated to a BGA socket 165 in a designated proper orientation, in this example with first conductive pin 267*a* of BGA SSD package 163 mated to and electrically contacting designated conductive pad 263*a* of BGA socket 165, which is shown superimposed in dashed outline. In this correctly mated orientation, the other conductive pins 267 of BGA SSD package 163 are correctly mated and electrically connected to other respective conductive pads 263 of BGA socket 165 in proper intended relationship (e.g., including power input pin 267*c* of BGA SSD package 163 that is correctly mated to and electrically contacting conductive power output pad 263*b* of BGA socket 165). Also in this correctly mated orientation, the floating NC state presented at designated conductive pad 263*a* of BGA socket 165 turns on switch S1 as shown, which connects the voltage divider R1//R2 to the FB node. Thus, at system startup and before energizing $V_{OUT\_1}$ from VR 177, comparator 253 compares $V_{REF}$ to $V_{FB}$ (i.e., resistance at FB node is R1//R2), senses that $V_{REF}$ is greater than $V_{FB}$, and outputs voltage enable signal ($V_{OUT\_EN}$) to enable $V_{OUT\_1}$ of VR 177 to conductive power input pin 267*c* of BGA SSD package 163 through conductive power output pad 263*b* of BGA socket 165.

FIG. 3B shows the BGA SSD package 163 and BGA socket 165 of FIG. 3A mated together in an improper orientation that is rotated 180 degrees from the designated proper orientation, i.e., with second conductive pin 267*b* of BGA SSD package 163 mated to and electrically contacting designated conductive pad 263*a* of BGA socket 165, which is again shown superimposed in dashed outline. In this incorrectly mated orientation, the other conductive pins 267 of BGA SSD package 163 (including power input pin 267*c*) are incorrectly mated and electrically connected to other respective conductive pads 263 of BGA socket 165. In this regard, power input pin 267*c* of BGA SSD package 163 is not correctly mated to (and does not electrically contact) conductive power output pad 263*b* of BGA socket 165, but rather is incorrectly mated to another pad 263 of BGA socket 165 to which it is not designated to mate. Also in this incorrectly mated orientation, the grounded state presented at designated conductive pad 263*a* of BGA socket 165 does not turn on switch S1 (i.e., switch S1 is off since its gate is pulled low) as shown, which electrically disconnects or isolates the FB node from the voltage divider R1//R2. Thus, at system startup and before energizing $V_{OUT\_1}$ from VR 177, comparator 253 compares $V_{REF}$ to $V_{FB}$ (i.e., the only resistance seen at the FB node is internal pullup resistor R4), senses that $V_{REF}$ is equal to $V_{FB}$, and disables $V_{OUT\_1}$ of VR 177 by not outputting the voltage enable signal ($V_{OUT\_EN}$) so as to avoid shorting out the VR 177 or damaging the circuitry of BGA SSD package 163.

As further shown in FIGS. 1, 3A and 3B, EC 181 is also coupled to electrical conductor 195 to execute system basic input/output system (BIOS) 107 to monitor the circuit state of the control signal (FLIP) received across conductor 195 at system startup from BGA SSD of BGA SSD package 163 before $V_{OUT\_1}$ is enabled from VR 177. In this embodiment, control signal (FLIP) has a floating NC circuit state when BGA SSD package 163 is mated in a correct orientation relative to BGA socket 165, and control signal (FLIP) has a grounded circuit state when BGA SSD package 163 is mated in a incorrect orientation relative to BGA socket 165. As described in relation to FIG. 4, EC 181 may be programmed to provide command or instruction 197 directly to TCON 141 to cause TCON 141 to retrieve graphics data corresponding to an error message from display device nonvolatile memory 143. EC 181 may be programmed to instruct or command the TCON 141 to display the error message on a display panel of external or internal display device 140 when EC 181 senses a grounded circuit state of control signal (FLIP) on electrical conductor 195 at system power-on. Such an error message may be displayed to notify a user of information handling system 100 that BGA SSD package 163 is mated in an incorrect orientation with BGA socket 165. Further information on methods and systems that may be used to enable an embedded controller to cause display of a pre-boot error messages on a display device or display panel at information handling system power-on may be found described in U.S. patent application Ser. No. 16/530,171 filed Aug. 2, 2019, which is incorporated herein by reference in its entirety for all purposes.

Figure 4:
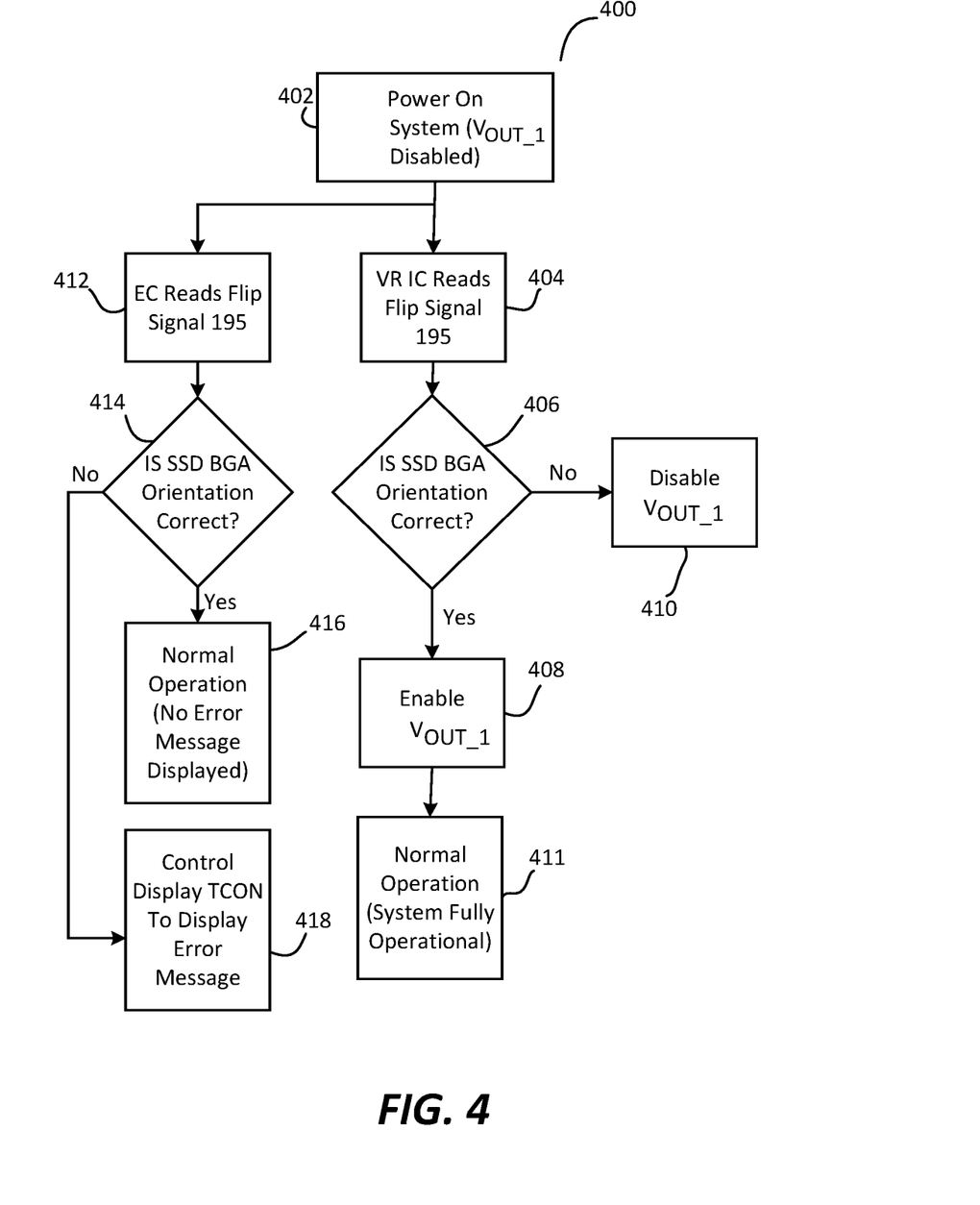
FIG. 4 illustrates methodology according to one exemplary embodiment of the disclosed systems and methods.

FIG. 4 illustrates methodology 400 that may be implemented in one exemplary embodiment of the disclosed systems and methods to automatically sense and verify proper mated orientation of BGA SSD package 163 to BGA SSD 165 at system power-on and before completing system boot. Methodology 400 begins in step 402 at system power-on of information handling system 100 while system BIOS is executing and before $V_{OUT\_1}$ is enabled from VR 177. At system power-on, EC 181 directly senses the circuit state of control signal (FLIP) on electrical conductor 195 in step 412, and VR controller 179 indirectly senses the circuit state of control signal (FLIP) on electrical conductor 195 by sensing the state of switch S1 in step 404 (e.g., as described in relation to FIGS. 3A and 3B).

If in step 406 VR controller 179 senses that switch S1 is turned on (i.e., BGA SSD package 163 is mated in correct orientation to BGA socket 165 as shown in FIG. 3A), then VR controller 179 enables $V_{OUT\_1}$ of VR 177 to power BGA socket 165 in step 408 and information handling system 100 becomes fully operational in step 411 with power provided by VR 177 at $V_{OUT\_1}$ via system power rails to BGA socket 165 and BGA package 163. However, if in step 406 VR controller 179 senses that switch S1 is turned off (i.e., BGA SSD package 163 is incorrectly mated to BGA socket 165 as shown in FIG. 3B), then VR controller 179 disables (or does not turn on) $V_{OUT\_1}$ to BGA socket 165 from VR 177 in step 408. Thus at step 410, no power is provided by VR 177 at $V_{OUT\_1}$ via system power rails to BGA socket 165 and BGA package 163, and information handling system 100 does not become fully operational.

If in step 414 system BIOS executing on EC 181 senses a grounded circuit state of the control signal (FLIP) on electrical conductor 195 (i.e., BGA SSD package 163 is incorrectly mated to BGA socket 165 as shown in FIG. 3B), then EC 181 provides instruction or command 197 directly to TCON 141 to cause TCON 141 to retrieve and display a corresponding designated error message from memory 143 on the external or internal display device 140 to the system user to indicate that BGA SSD package 163 is incorrectly mated to BGA socket 165, e.g., error message such as "BGA SSD package is incorrectly mated to BGA SSD package. Please power off and unplug the system and correct the BGA package orientation". However, if in step 414 system BIOS on EC 181 senses a floating NC circuit state of the control signal (FLIP) on electrical conductor 195 (i.e., BGA SSD package 163 is mated in correct orientation to BGA socket 165 as shown in FIG. 3A), then methodology 400 proceeds to step 416 where normal system operation proceeds per step 411 and EC 181 does not cause TCON 141 to display the error message of step 418 on the external or internal display device 140.

It will be understood that the particular order and combination of steps of FIG. 4 is exemplary only, and that any other combination of fewer, additional and/or alternative steps may be employed that is suitable to automatically sense and determine whether or not BGA SSD package 163 is mated in correct orientation to BGA SSD 165, and to take one or more designated actions based on this determination (e.g., enabling or disabling $V_{OUT\_1}$ from VR 177 to BGA socket 165/BGA SSD package 163 and/or displaying an error message to the user).

It will also be understood that the particular configuration of circuitry and block diagram architecture illustrated in FIGS. 1, 2A-2D, 3A and 3B is exemplary only, and that any other circuit configuration may be employed that is suitable for sensing circuit state presented by a designated conductive pin or pad of a BGA package at a designated conductive pad of a mating BGA socket to determine whether or not the BGA package is properly orientated relative to the mated BGA socket, and for taking a designated action based on whether or not proper orientation of the mated BGA package is verified e.g., such as disabling VR output power to the BGA package and/or other system circuitry, and/or for displaying an error message to a user of an information handling system that includes the VR and BGA socket and mated BGA package). For example, in one embodiment, a grounded circuit state of the control signal (FLIP) on electrical conductor 195 may be used to indicate that BGA SSD package 163 is mated in the correct orientation to BGA socket 165, and a floating NC circuit state of the control signal (FLIP) on electrical conductor 195 may be used to indicate that BGA SSD package 163 is mated in an incorrect orientation to BGA socket 165.

It will also be understood that one or more of the tasks, functions, or methodologies described herein (e.g., including those described herein for components 110, 141, 150, 179, 181, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
    a removable BGA package having first and second electrically-conductive pins disposed on a first side of the removable BGA package in symmetric relationship to each other on opposing sides of a center point of the first side of the removable BGA package so as to present different respective circuit states on opposing sides of the center point;
    a BGA socket configured to mate with the removable BGA package, the BGA socket having a first electrically-conductive pad disposed on a first side of the BGA socket; and
    at least one programmable integrated circuit electrically coupled to the first electrically-conductive pad of the BGA socket and programmed to sense whether a mated orientation of the removable BGA package relative to the BGA socket is a correct orientation or an incorrect orientation based on the circuit state presented to the first electrically-conductive pad of the BGA socket by the first or second electrically-conductive pin of the removable BGA package;
where the at least one programmable integrated circuit is programmed to take at least one action based on the sensed mated orientation of the removable BGA package relative to the BGA socket.

2. The information handling system of claim 1, where the removable BGA package comprises at least one power-consuming component; and where the at least one programmable integrated circuit is programmed to take an action to enable output of power to the power-consuming component of the removable BGA package only if the sensed mated orientation of the removable BGA package relative to the BGA socket is the correct orientation.

3. The information handling system of claim 1, where the at least one programmable integrated circuit is programmed to take an action to display a message to a user of the information handling system only if the sensed mated orientation of the removable BGA package relative to the BGA socket is the incorrect orientation.

4. An information handling system, comprising:
a removable BGA package having first and second electrically-conductive pins disposed on a first side of the removable BGA package in symmetric relationship to each other on opposing sides of a center point of the first side of the removable BGA package so as to present different respective circuit states on opposing sides of the center point;
a BGA socket configured to mate with the removable BGA package, the BGA socket having a first electrically-conductive pad disposed on a first side of the BGA socket; and
at least one programmable integrated circuit electrically coupled to the first electrically-conductive pad of the BGA socket and programmed to determine a mated orientation of the removable BGA package relative to the BGA socket based on the circuit state presented to the first electrically-conductive pad of the BGA socket by the first or second electrically-conductive pin of the removable BGA package;
where the at least one programmable integrated circuit is programmed to take at least one action based on the determined mated orientation of the removable BGA package relative to the BGA socket;
where the BGA socket is shaped and dimensioned to:
receive the first side of the removable BGA package in a first orientation with the first electrically-conductive pad of the BGA socket aligned with and electrically contacting the first electrically-conductive pin of the removable BGA package to present a first circuit state to the first electrically-conductive pad of the BGA socket, and
receive the first side of the removable BGA package in a second and different orientation with the first electrically-conductive pad of the BGA socket aligned with and electrically contacting the second electrically-conductive pin of the removable BGA package to present a second circuit state to the first electrically-conductive pad of the BGA socket; and
where the at least one programmable integrated circuit is programmed to:
determine the mated orientation of the removable BGA package relative to the BGA socket by sensing the circuit state presented to the first electrically-conductive pad of the BGA socket by the first or second electrically-conductive pin of the removable BGA package, and
then take a first action only if the sensed circuit state is the first circuit state.

5. The information handling system of claim 4, where the first circuit state is a floating circuit state, and where the second circuit state is a grounded circuit state.

6. The information handling system of claim 4, further comprising a voltage regulator electrically coupled to provide power to a power-consuming component of the removable BGA package through the BGA socket, the voltage regulator comprising the at least one programmable integrated circuit; where the first circuit state corresponds to a correctly mated orientation of the removable BGA package relative to the BGA socket; and where the first action comprises enabling output of power from the voltage regulator to the power-consuming component of the removable BGA package.

7. The information handling system of claim 6, further comprising at least one other programmable integrated circuit coupled to the first electrically-conductive pad of the BGA socket and programmed to determine a mated orientation of the removable BGA package relative to the BGA socket based on the circuit state presented to the first electrically-conductive pad of the BGA socket by the first or second electrically-conductive pin of the removable BGA package; where the at least one other programmable integrated circuit is programmed to:
determine the mated orientation of the removable BGA package relative to the BGA socket by sensing the circuit state presented to the first electrically-conductive pad of the BGA socket by the first or second electrically-conductive pin of the removable BGA package; and
then take a second action only if the sensed circuit state is the second circuit state, the second action comprising displaying an error message to a user of the system;
where the second circuit state corresponds to an incorrectly mated orientation of the removable BGA package relative to the BGA socket; and
where the second action comprises displaying a message to a user of the information handling system.

8. The information handling system of claim 7, further comprising a display device;
and where the at least one other programmable integrated circuit comprises an embedded controller (EC) of the information handling system programmed to cause display of the message on the display device to the user of the information handling system.

9. The information handling system of claim 1, where the removable BGA package comprises a solid state drive (SSD).

10. The information handling system of claim 1, further comprising a voltage regulator electrically coupled to provide power to a power-consuming component of the removable BGA package through the BGA socket, the voltage regulator comprising the at least one programmable integrated circuit; and where the at least one programmable integrated circuit is programmed to:
enable output of power from the voltage regulator to the power-consuming component of the removable BGA package only if the sensed mated orientation of the removable BGA package relative to the BGA socket is the correct orientation.

11. The information handling system of claim 10, where the at least one programmable integrated circuit of the voltage regulator is electrically coupled to a first electrically-conductive pad of the BGA socket and is programmed to sense the mated orientation of the removable BGA package relative to the BGA socket based on a circuit state presented to the first electrically-conductive pad of the BGA socket.

12. A method of operating the information handling system of claim 1, comprising executing logic on the programmable integrated circuit to:
sense whether a mated orientation of the removable BGA package relative to the BGA socket is a correct orientation or an incorrect orientation based on a circuit state presented to the first electrically-conductive pad of the BGA socket by the first or the second electrically-conductive pin of the removable BGA package, the first and second electrically-conductive pins being disposed on the first side of the removable BGA package in symmetric relationship to each other on the opposing sides of the center point of the first side of the removable BGA package so as to present the different respective circuit states on the opposing sides of the center point to the first electrically-conductive pad of the BGA socket; and
take the at least one action based on the sensed mated orientation of the removable BGA package relative to the BGA socket.

13. The method of claim 12, where the removable BGA package comprises at least one power-consuming component; and where the method further comprises executing the logic on the at least one programmable integrated circuit to take an action to enable output of power to the power-consuming component of the BGA package only if the sensed mated orientation of the removable BGA package relative to the BGA socket is the correct orientation.

14. The method of claim 12, further comprising executing the logic on the at least one programmable integrated circuit to take an action to display a message to a user only if the sensed mated orientation of the removable BGA package relative to the BGA socket is the incorrect orientation.

15. A method of operating the information handling system of claim 4, comprising executing logic on the programmable integrated circuit to:
determine a mated orientation of the removable BGA package relative to the BGA socket based on a circuit state presented to the first electrically-conductive pad of the BGA socket by the first or the second electrically-conductive pin of the removable BGA package, the first and second electrically-conductive pins being disposed on the first side of the removable BGA package in symmetric relationship to each other on the opposing sides of the center point of the first side of the removable BGA package so as to present the different respective circuit states on the opposing sides of the center point to the first electrically-conductive pad of the BGA socket; and
take the at least one action based on the determined mated orientation of the removable BGA package relative to the BGA socket;
where the BGA socket is shaped and dimensioned to:
receive the first side of the removable BGA package in a first orientation with the first electrically-conductive pad of the BGA socket aligned with and electrically contacting the first electrically-conductive pin of the removable BGA package to present a first circuit state to the first electrically-conductive pad of the BGA socket, and
receive the first side of the removable BGA package in a second and different orientation with the first electrically-conductive pad of the BGA socket aligned with and electrically contacting the second electrically-conductive pin of the removable BGA package to present a second circuit state to the first electrically-conductive pad of the BGA socket;
where the method further comprising executing the logic on the at least one programmable integrated circuit to:
determine the mated orientation of the removable BGA package relative to the BGA socket by sensing the circuit state presented to the first electrically-conductive pad of the BGA socket by the first or second electrically-conductive pin of the removable BGA package, and
then take a first action only if the sensed circuit state is the first circuit state.

16. The method of claim 15, where the first circuit state is a floating circuit state, and where the second circuit state is a grounded circuit state.

17. The method of claim 15, further comprising operating a voltage regulator of an information handling system to provide power to a power-consuming component of the removable BGA package through the BGA socket, the voltage regulator comprising the at least one programmable integrated circuit; where the first circuit state corresponds to a correctly mated orientation of the removable BGA package relative to the BGA socket; and where the first action comprises enabling output of power from the voltage regulator to the power-consuming component of the removable BGA package.

18. The method of claim 17, further comprising executing logic on the at least one programmable circuit to:
determine the mated orientation of the removable BGA package relative to the BGA socket by sensing the circuit state presented to the first electrically-conductive pad of the BGA socket by the first or second electrically-conductive pin of the removable BGA package; and
then take a second action only if the sensed circuit state is the second circuit state, the second action comprising displaying an error message to a user of the information handling system, the second circuit state corresponding to an incorrectly mated orientation of the removable BGA package relative to the BGA socket, and the second action comprising displaying a message to a user of the information handling system.

19. The method of claim 18, further comprising executing logic on at least one other programmable integrated circuit to cause display of the message on a display device of the information handling system, the at least one other programmable integrated circuit comprising an embedded controller (EC) of the information handling system.

20. The method of claim 12, where the removable BGA package comprises a solid state drive (SSD) of the information handling system.

21. The information handling system of claim 4, where the first circuit state presented to the first electrically-conductive pad of the BGA socket by the first electrically-conductive pin of the removable BGA package when the first electrically-conductive pad of the BGA socket is aligned with and electrically contacting the first electrically-conductive pin of the removable BGA package is an electrically floating circuit state, and where the second circuit state presented to the first electrically-conductive pad of the BGA socket by the second electrically-conductive pin of the removable BGA package when the first electrically-conductive pad of the BGA socket is aligned with and electrically contacting the second electrically-conductive pin of the removable BGA package is an electrically grounded circuit state.

22. The method of claim 15, where the first circuit state presented to the first electrically-conductive pad of the BGA socket by the first electrically-conductive pin of the removable BGA package when the first electrically-conductive pad of the BGA socket is aligned with and electrically contacting the first electrically-conductive pin of the removable BGA package is an electrically floating circuit state, and where the second circuit state presented to the first electrically-conductive pad of the BGA socket by the second electrically-conductive pin of the removable BGA package when the first electrically-conductive pad of the BGA socket is aligned with and electrically contacting the second electrically-conductive pin of the removable BGA package is an electrically grounded circuit state.

* * * * *